J. L. CREVELING.
ELECTRIC REGULATION.
APPLICATION FILED SEPT. 27, 1920.
1,435,215.
Patented Nov. 14, 1922.
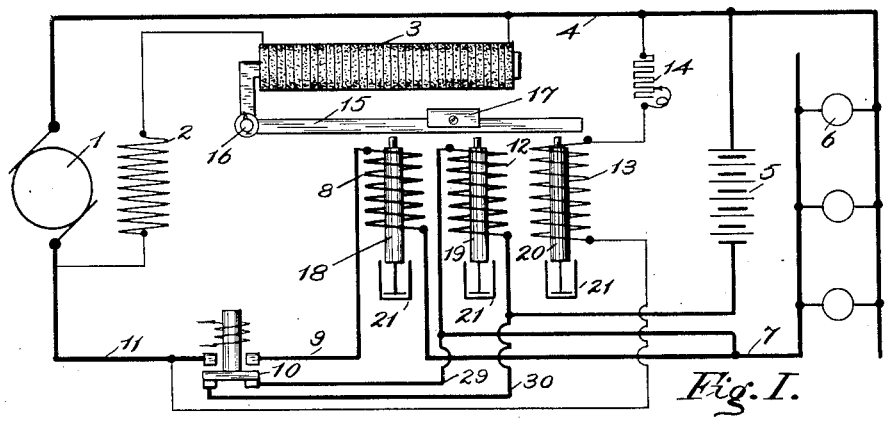
Fig. I.
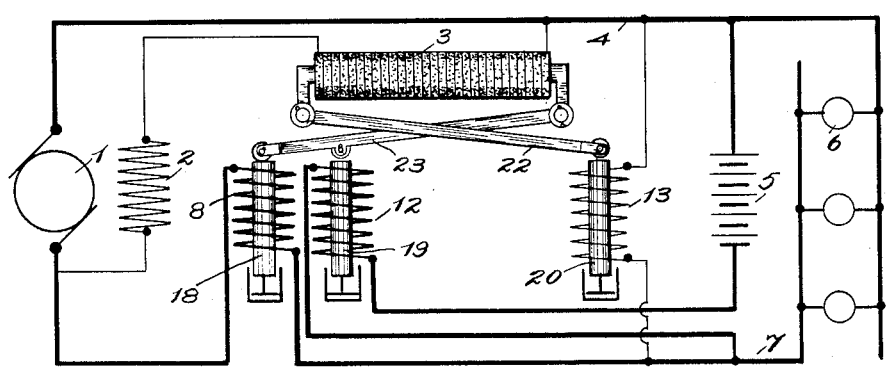
Fig. II.
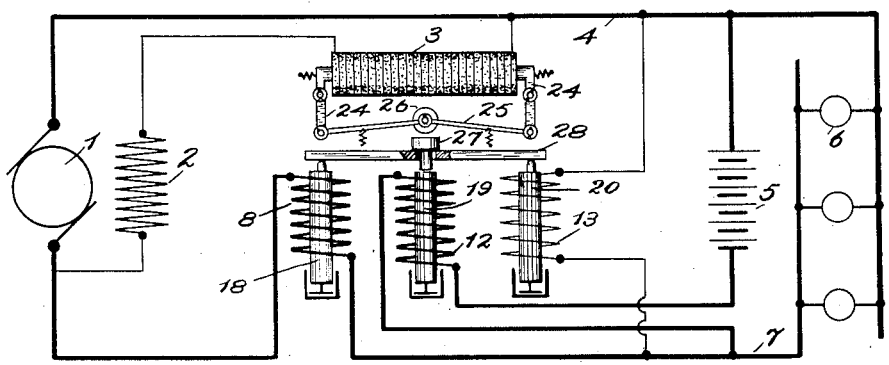
Fig. III.
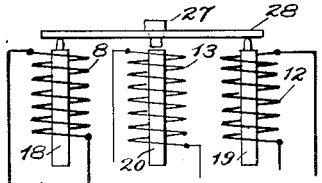
Fig. IV.
INVENTOR
John L. Creveling Patented Nov. 14, 1922.

1,435,215

UNITED STATES PATENT OFFICE.

JOHN L. CREVELING, OF TUCSON, ARIZONA, ASSIGNOR TO GOULD COUPLER COMPANY, A CORPORATION OF NEW YORK.

ELECTRIC REGULATION.

Application filed September 27, 1920. Serial No. 412,952.

*To all whom it may concern:*

Be it known that I, JOHN L. CREVELING, a citizen of the United States, residing at Tucson, county of Pima, and State of Arizona, have invented certain new and useful Improvements in Electric Regulations, of which the following is a description.

My invention pertains to that class of electric regulation wherein the voltage impressed upon a given circuit and the current flowing in a plurality of circuits are to be automatically controlled in a predetermined manner.

More specifically, my invention is particularly applicable to a system of electrical distribution wherein a dynamo or generator driven at varying speed is used to charge a storage battery and operate lamps or other translating devices in conjunction therewith and wherein it is desired that the voltage impressed upon a circuit supplied by the generator and the current delivered to the battery and the total output of the generator shall all be automatically held from exceeding predetermined limits. Therefore, it will be described with reference to such a system which is very applicable for the specific use of lighting railway cars when the dynamo is driven from an axle of a car, as is now a common practice.

This application is a continuation, in so far as common subject-matter is disclosed, of my applications for patent for improvements in electric regulation, Serial No. 153,134, filed March 7, 1917; Serial No. 160,717, filed April 9, 1917; and Serial No. 160,718, filed April 9, 1917.

Fig. I is a diagrammatic representation of one type of system illustrating an embodiment of my invention.

Fig. II is a modified type of system illustrating another embodiment of my invention.

Fig. III is a modified type of system illustrating another embodiment of my invention; and Fig. IV is a modification that may be made in the structure of Fig. III.

In the drawing, referring particularly to Fig. I, 1 represents a dynamo or generator provided with the usual field coil 2 having in series therewith a suitable regulating device, in this instance indicated as a carbon pile rheostat 3, which is shown merely to illustrate broadly some means whereby the electrical operation of the generator may be controlled. And it will be obvious that this may be accomplished by proper manipulation of the pressure upon the carbon pile 3. 4 is the positive lead of the generator which is carried to the positive side of the storage battery 5 and the positive terminals of the lamps or other translating devices indicated at 6. The negative terminals of the translating devices 6 are connected with the lead 7 which is in communication with one end of the solenoid or winding 8, the opposite end of which is connected as by wire 9 with one side of a suitable switch indicated at 10, the opposite side of which is connected as by lead 11 with the negative side of the generator. The negative side of the battery 5 is connected through the solenoid or winding 12 with the lead 7; and, if desired, a shunt may be placed around the coil 12, as indicated by wires 29 and 30, so arranged that the shunt circuit is closed when the switch 10 is open and the shunt circuit opened when the switch 10 is closed.

The switch 10 is preferably one of the automatic variety adapted to close the generator circuit when the voltage of the generator is substantially equal to or slightly in excess of that of the battery and to open the circuit when the generator voltage falls to substantially that of the battery, or slightly below the same, so as to prevent back discharge from the battery through the generator. As such switches are now well known in the art, details are purposely omitted for the sake of simplicity, and the mere presence of such a switch is indicated.

The voltage winding or solenoid 13 is connected in shunt across a circuit the voltage of which it is desired to hold from exceeding a predetermined limit and, in this instance, is shown as directly across the generator through an adjustable resistance 14 which may be used for the purpose of adjustment of the operation of the coil.

The pressure upon the pile 3 is controlled by the bell-crank lever 15, pivoted as at 16, and provided with a weight or other equivalent instrumentality, indicated at 17, for the purpose of adjustment. The coils 8, 12 and 13 are provided with cores 18, 19 and 20, respectively, which the said coils tend to raise when energized; while too sudden motion of the cores is restrained by the dashpots indicated at 21. Each of the said cores is provided with an upward extension, preferably of non-magnetic material, whereby the cores when raised may affect the lever 15 and thereby affect the pressure upon the pile 3 or properly effect any other instrumentality that may be used to control the electrical operation of the generator 1.

In Fig. II like numerals are used to indicate like parts, and the regulating element or pile 3 is shown as operated by two bell-crank levers 22 and 23, respectively; the lever 22 being operated by the core 20 of the voltage winding or coil 13, and the lever 23 being operated by either the core 18 of the solenoid 8 or the core 19 of the solenoid 12.

In Fig. III the pile 3 is shown as controlled by the levers 24 operating upon each end of the pile and connected as by means of the toggle-joint 25, the knuckle of which carries a sheave or roller 26 engaged by the movable member 27 when the same is pressed upwardly by the core 19 of the solenoid 12 or lifted by means of the member 28, as when either or both ends of the said member 28 shall be sufficiently raised by the core 18 of solenoid 8, the core 20 of solenoid 13, or both cores conjointly.

In Fig. IV the only modification intended to be brought out resides in the fact that the member 27 may be operated independently by the voltage responsive means, irrespective of either of the current responsive means.

An operation of my invention is substantially as follows, referring particularly to Fig. I.

If the generator be at rest or operating at sufficiently low speed, the switch 10 will be open and prevent back discharge from the battery through the generator while the lamps or other translating devices may be fed by the battery 5 through its connection with the lead 4, and return to the battery made through lead 7 and solenoid 12 and the branch 29—30 in shunt to the said solenoid, if the type of switch indicated at 10 be used. Under such conditions, the solenoid 12 may be ineffectively or only slightly excited notwithstanding a considerable current may be flowing from the battery through the translating circuit, as such current may flow almost entirely through the low resistance shunt 29—30.

If the generator speed and voltage be brought up until somewhat in excess of that of the storage battery 5, switch 10 will be closed and current will flow from the generator 1 through the lead 4 to the battery 5 and translating devices 6. The current which flows through the battery 5 will traverse the coil 12, while the entire generator current including that supplied to the battery and also to the translating circuit will flow through the coil 8, lead 9, switch 10 and lead 11 to the generator 1. And if the load upon the translating circuit, as indicated by the translating devices 6, be heavy and the battery 5 in a more or less discharged state with its voltage correspondingly low, the battery and translating devices might receive from the generator a heavier current than desired or even safe for the same to deliver even though the generator voltage be below a value often desired when the battery is in a higher state of charge.

I preferably adjust the solenoid 8 so that when the maximum desired current is being delivered by the generator any increase will raise the core 18 smoothly against the action of the dashpot 21 and lift the lever 15 so as to relieve the pressure upon the pile 3 and increase the resistance thereof in such manner as to cut down the excitation of the coil 2 and prevent the generator from delivering a current in excess of the predetermined desired maximum. If while so operating, the load upon the translating circuit be thrown off and the load upon the generator thus sufficiently lessened, coil 8 will tend to allow the core 18 to descend and allow lever 15 to cause the pressure upon the pile 3 to be increased under the influence of the weight 17, or other equivalent instrumentality used for the purpose of adjustment and the generator will tend to increase its output to the above mentioned maximum value limited by the coil 8. Should the battery, however, still be in a quite discharged condition, this entire current might be forced through the battery without the voltage of the generator rising to a value often desired to carry when the battery is in a higher state of charge, and under such conditions the battery would receive too great a current from the generator or a current larger than desired to use in charging, I so arrange the coil 12 that when the desired maximum charging current is reached any further increase will raise the core 19 and, by lifting the lever 15 affect the generator through the instrumentality of the regulating device, of whatever type may be employed, so that this maximum desired charging current cannot be exceeded throughout speed changes of the generator 1.

If, now, a heavy load again be thrown upon the translating circuit, and if this tend to cause the generator to deliver too great a current, coil 8 will again assume the regulation of the generator, as first pointed out above. And if this load be again thrown off, coil 12 will again assume the regulation of the generator, as above mentioned. And if, while running as above outlined, the voltage across the generator tend to exceed a predetermined desired maximum, the coil 13 may be so arranged and the resistance 14 so adjusted that when this maximum is reached core 20 will be lifted and affect the lever 15 in such manner as to control the voltage of the generator and prevent this desired maximum value from being exceeded.

In practice, in a system of the type here described, I usually prefer to so arrange the coil 13 and resistance 14 that, when the fully charged voltage across the battery 5 is reached, coil 13 will lift the core 20 and by affecting the lever 15 perform the function of regulating the generator to prevent this voltage from being exceeded. And, therefore, as this voltage will be held substantially constant, the current flowing to the battery 5 will fall off and approach zero as the battery becomes more fully or completely charged. While the generator is thus operating under voltage control, if for any reason its total output tend to exceed a predetermined limit, coil 8 will raise the core 18 and assume the control of the generator and prevent the total desired output from being exceeded. And if for any reason the current in the battery circuit should tend to increase above a predetermined desired maximum current in this circuit, as measured by the coil 12, the said coil will raise the core 19 and assume the regulation of the generator, as above outlined.

It will therefore be noted that my invention provides means whereby the generator is prevented from being overloaded, as the total generator current cannot exceed a predetermined amount.

It will also be noted that the charging current to the battery cannot exceed a predetermined desired value.

It will also be noted that the voltage upon that part of the system measured by the coil 13 cannot exceed a predetermined limit, and, if the coil 13 be across the generator, its voltage cannot increase beyond this predetermined limit, even if the leads or some portion of the load circuits be open or broken, as for example the battery circuit opened; as the regulation of the generator is at no time entirely dependent upon the current output in any circuit.

An operation of the system of Fig. II may be readily followed from the foregoing description of Fig. I, it only being necessary to note that the coil 8 and the coil 12 affect the pile 3 or other instrumentality used for regulating the generator through action of the lever 23; while the voltage coil 13 operates independently upon the regulating device 3 through its separate regulating lever or instrumentality 22.

An operation of that modification shown in Fig. III may be readily followed from the foregoing description of the system of Fig. I, it being only necessary to note that coil 8, upon raising its core 18, lifts the left-hand end of the member 28 together with the member 27, which member by coming in contact with the sheave or roller 26 lifts the knuckle of the toggle-joint 25 and thus, through the instrumentality of the levers 24, operates the pile or other instrumentality chosen for regulating the generator 1; and that coil 13 lifts the right-hand side of the member 28 in a similar manner to affect the regulating element 3; while coil 12, by raising the core 19, affects the movable member 27 directly and thereby affects the regulating element 3.

An operation of the modification indicated in Fig. IV is substantially the same as that of Fig. III, with the exception that it is the voltage responsive coil 13 that directly and independently affects the member 27, while the two current responsive coils may coact to affect the member 28 and thereby affect the member 27 to manipulate the element 3 to control the generator.

It will be noted that in Figs. II and III the shunting device and circuit 29—30 are omitted merely for the sake of clearness and because the same may be used or not, depending upon whether or not the load upon the battery when the generator is inoperative is sufficient to lift the core 19. The coil 13 is shown across the leads 4 and 7 at a point further removed from the generator, merely for the sake of clearness. In practice, it is usually desirable to connect the coil 13 as close as possible to the generator so as to protect the same from an excess voltage against breakage of as much of the leads or other connections as possible.

I do not wish in any way to limit myself to any of the exact constructions or details of operation given above to illustrate embodiments of my invention, for it will be obvious that wide departure may be made therein without departing from the spirit and scope thereof.

What I claim is:

1. The combination with a source of electro-motive-force, a storage battery and translating devices supplied thereby, of means for controlling the value of the electro-motive-force at the source, means for independently operating said controlling means responsive to the electro-motive-force impressed upon a circuit supplied by the source, means for independently operating said controlling means affected by the current supplied to the battery and means for independently affecting said controlling means operated by current supplied to the battery and translating devices, the arrangement of the controlling and operating means being such that the controlling means may be operated independently in response to fluctuations in any one of the above-named quantities and will permit any other of the above-named quantities to assume the control when the value thereof tends to exceed a predetermined standard.

2. The combination with a dynamo, storage battery and translating devices supplied thereby, of means for regulating the dynamo responsive to voltage fluctuations, independently responsive to fluctuations in dynamo output and independently responsive to fluctuations in battery charging current.

3. The combination with a dynamo, a storage battery and battery circuit, translating devices and a main circuit for supplying the battery circuit and translating devices, of means for regulating the dynamo for speed changes responsive to voltage fluctuations and independently responsive to fluctuations in the main circuit and in the battery circuit.

4. The combination with a dynamo, a main circuit, a storage battery and a battery circuit and means for regulating the dynamo, of voltage responsive means affecting the regulating means, means for affecting the regulating means in response to current fluctuations in the main circuit, and means for affecting the regulating means in response to current fluctuations in the battery circuit.

5. The combination with a generator, a regulating element therefor, and voltage operated means affecting the regulating element upon changes in voltage above a predetermined limit only, of a plurality of means each independently affecting the regulating means in response to current fluctuations in one of a plurality of circuits supplied by the generator and preventing the current in said circuits from exceeding predetermined values therein respectively.

6. The combination with a generator, a regulating element therefor, and voltage responsive means affected by the operation of the generator and affecting the regulating element, of a plurality of current responsive means each separately affected by current in a different one of a plurality of circuits supplied by the generator and means whereby said current responsive means may each independently and separately affect the regulating means to lower the voltage of the generator independently of the voltage responsive means, said voltage responsive means being capable of lowering the voltage independently of all said current responsive means.

7. The combination with a generator, of a regulating element therefor, voltage responsive means for affecting the regulating element, a plurality of current responsive means each separately affected by current in one of a plurality of circuits supplied by the generator, said current responsive means each being independently capable of affecting the regulating element to lower the voltage of the generator independently of the voltage responsive means, said current responsive means each being capable of operating the regulating element and allowing the voltage responsive means to assume the entire operation of the regulating element.

8. The combination with a generator, a storage battery and translating devices supplied thereby and regulating means controlling the operation of the generator, of means for operating the same in response to voltage fluctuations, current responsive means affecting the regulating means in response to fluctuations in generator output when above a predetermined value only, and current responsive means adapted to affect the regulating means in response to fluctuations in the battery charging current above a predetermined value only, all responsive means being capable of independently lowering the voltage of the generator and none being capable of raising the voltage of the generator when another of the responsive means is operative.

9. The combination with a generator, a plurality of circuits fed thereby, regulating means for the generator and voltage operated means affecting the regulating means and preventing the voltage impressed upon all of said circuits from rising above a predetermined limit, of a plurality of means for singly controlling the regulating means and each independently responsive to electrical fluctuations in a different one of a plurality of circuits supplied by the generator independently and preventing electrical quantities measured thereby in said circuits from exceeding predetermined values therein respectively.

10. The combination with a source of voltage and regulating means therefor, of voltage responsive means for controlling the regulating means to hold the voltage substantially constant under predetermined conditions of operation, a plurality of circuits supplied with current from said source against counter-electromotive force and relatively low resistance on account of which relationship small changes in voltage may cause relatively great changes in current in said circuits and the current in said circuits may be controlled by relatively small changes in voltage, and a plurality of independent current responsive means each affected by the current in one of said circuits for separately controlling the regulating means to hold a voltage upon the system below that value necessary to cause the current its circuit to exceed a predetermined operating value.

11. The combination with a source of voltage tending to vary throughout wide limits, regulating means therefor, voltage responsive means for controlling the regulating means to hold the voltage from exceeding a predetermined value, a plurality of circuits supplied with current from said source against counter-electromotive force of variable values at times permitting undesirably large currents to flow in said circuits at voltages permitted by the voltage responsive means, of current responsive means independently responsive to current fluctuations in a plurality of said circuits and affecting the regulating means to cause a desired distribution of current between said circuits by controlling the current in certain of said circuits.

12. The combination with a generator, a storage battery and translating devices supplied thereby, of means for regulating the generator responsive to fluctuations in the current supplied to the battery and independently responsive to fluctuations in the current output of the generator.

13. The combination with a dynamo and regulating means, a storage battery and battery circuit, translating devices and a main circuit for supplying the battery circuit and the translating devices, of means for regulating the dynamo for speed changes responsive to current fluctuations in the battery circuit and independently responsive to fluctuations in the main circuit.

14. The combination with a variable speed generator, a storage battery and translating devices supplied thereby, of means for regulating the generator throughout speed changes and responsive means for controlling the same, preventing the generator output from exceeding a predetermined working maximum and independently preventing the charging current from exceeding a predetermined working maximum.

JOHN L. CREVELING.

Certificate of Correction.

It is hereby certified that in Letters Patent No. 1,435,215, granted November 14, 1922, upon the application of John L. Creveling, of Tucson, Arizona, for an improvement in "Electric Regulation," errors appear in the printed specification requiring correction as follows: Page 1, line 6, title of invention, for "Electric Regulations" read *Electric Regulation;* page 2, line 11, for the word "effect" read *affect*, and line 98, before the word "or." and line 100, after the syllable "ment" insert a parenthesis; page 4, line 100, claim 9, for "independently and" read *and independently;* and that the said Letters Patent should be read with these corrections therein that the same may conform to the record of the case in the Patent Office.

Signed and sealed this 9th day of January, A. D., 1923.

[SEAL.]

KARL FENNING,
*Acting Commissioner of Patents.*